United States Patent [19]
Ding et al.

[11] Patent Number: 5,893,507
[45] Date of Patent: Apr. 13, 1999

[54] AUTO-ADJUSTABLE PIN TOOL FOR FRICTION STIR WELDING

[75] Inventors: R. Jeffrey Ding, Athens; Peter A. Oelgoetz, Huntsville, both of Ala.

[73] Assignee: The United States of America as represented by the Administrator of the National Aeronautics and Space Administration, Washington, D.C.

[21] Appl. No.: 08/908,405

[22] Filed: Aug. 7, 1997

[51] Int. Cl.⁶ .................................................... B23K 20/12
[52] U.S. Cl. ............................... 228/2.1; 228/9; 156/580
[58] Field of Search ................................ 228/102, 103, 228/112.1, 2.1, 8, 9, 45; 156/64, 73.5, 580

[56] References Cited

U.S. PATENT DOCUMENTS

| | | | |
|---|---|---|---|
| 5,697,544 | 12/1997 | Wykes | 228/112.1 |
| 5,713,507 | 2/1998 | Holt et al. | 228/112.1 |

*Primary Examiner*—Samuel M. Heinrich
*Attorney, Agent, or Firm*—James J. McGroary

[57] ABSTRACT

An auto-adjusting pin tool for friction stir welding is presented wherein the pin tool automatically adjusts for welding materials of varying thicknesses, and the pin can be incrementally withdrawn from the workpieces thus eliminating any crater or keyhole in the weld. The inventive apparatus is comprised of a welding head housing a motor connected to a controller instrument package and an arbor supported by bearings. The arbor forms an interior cylinder and is encircled by a stationary slip ring though which are ported hydraulic passageways into the interior cylinder of the arbor such that a piston housed therein may be moved axially. Coupled to the piston is a pin tool which is treaded on its lower end and which is moveably seated in, and extending through, a shoulder housing having concave lower face. When welding, the rotating treaded end of the pin enters and stirs the workpieces while the lower face of the shoulder housing compacts the workpieces. As the welding head traverses the shoulder housing the controller senses any rising pressure on the lower face of the shoulder housing and withdraws the arbor to keep the pressure constant. At the same time, the piston moves towards the workpieces thus extending the pin further from the shoulder. This keeps the pin at a proper depth in the workpieces regardless of their thicknesses. As the weld terminates this same operation can be used to incrementally withdraw the pin during the final part of the traverse, thus eliminating any keyhole or crater that would otherwise be created.

13 Claims, 2 Drawing Sheets

5,893,507

AUTO-ADJUSTABLE PIN TOOL FOR FRICTION STIR WELDING

ORIGIN OF THE INVENTION

The invention described herein was made by an employee of the United States Government and may be manufactured and used by or for the Government for Government purposes without the payment of any royalties thereon or therefor.

BACKGROUND OF THE INVENTION

1. Field of the Invention

The present invention relates generally to friction stir welding wherein the heat necessary to create a weld is generated by plunging a rotating pin tool into the workpiece. More particularly, this invention relates to an auto-adjusting pin tool that can weld materials of varying thicknesses, and can terminate the weld joint with no voids, holes, craters or anomalies.

2. Description of Related Art

Presently pin tools for friction stir welding are of a fixed pin length, and have a disadvantage of only being able to weld materials of the same thickness, and leave a crater, or keyhole in the workpiece when the pin is retracted.

The present invention overcomes the disadvantages of the prior art devices in that the pin length is auto-adjusting and allows material of tapered thicknesses to be welded. The pin can also be incrementally retracted which eliminates the crater, or keyhole, at the weld's terminus characteristic of the prior art.

Accordingly, it is an object of the present invention to provide a new and improved auto-adjusting pin tool for friction stir welding which allows for the welding of materials of varying thicknesses without leaving a keyhole on weld termination.

Other aspects, objects and advantages of this invention will become apparent to those skilled in the art to which this invention pertains from a study of the preferred embodiment as set forth in the specifications, drawings and the appended claims.

SUMMARY OF THE INVENTION

The instant invention presents an auto-adjustable pin tool for friction stir welding. The pin tool is part of the head for a friction stir welding machine which has been adapted from a standard milling machine already known in the art. This type of machine is used to join two metal workpieces together. The two metals to be joined are positioned in a butt joint configuration and clamped into position. The pin is threaded and is rotated in the direction opposite the thread. The rotating pin is brought into contact with the juncture of the two metals and pressure is applied. The friction causes the metals to flow (become plasticised), and the pressure causes the pin to sink into the metals. The rotating pin is traversed along the juncture to stir the metals and join them.

The welding head includes a spindle housing which encloses a motor connected to a controller instrument package. The spindle housing can be traversed and moved axially as is known in the art for milling machines. Bearings inside the housing support an arbor for rotation, the arbor being driven by the motor. The arbor forms an interior cylinder. Encircling the arbor is a stationary slip ring. Ported through the arbor and to the cylinder are hydraulic passageways for controlling the up and down movement of a piston housed within the cylinder. The piston is connected by a coupling to a pin tool which is threaded on its lower end. The pin tool is seated in a pin sleeve having a shoulder with a concave lower face. The pin tool is splined to the pin sleeve for relative axial movement, and the shoulder is demountably fixed to the arbor by a set screw. When welding, axial movement of the arbor causes the shoulder to apply pressure to the metal workpieces being stirred to compact them. The welding head is traversed along a plane which is parallel to the plane of the back sides of the workpieces; any thickness variations therefore show up on the side of the workpieces facing the head. As the welding head traverses the shoulder an increasing thickness of the workpieces increases the pressure on the shoulder. The controller senses this rising pressure and withdraws the arbor to keep the pressure constant. At the same time, the piston is moved towards the workpieces thus extending the pin further from the shoulder. This keeps the pin at the proper depth in the workpieces regardless of their thicknesses. If the traversing shoulder senses less pressure (because of decreasing workpiece thickness) the controller moves the arbor toward the workpiece to maintain a constant pressure. At the same time, the piston moves upward to withdraw the pin to the appropriate depth in the workpieces.

BRIEF DESCRIPTION OF THE DRAWINGS

In the course of the following detailed description, reference will be made to the attached drawings wherein.

DESCRIPTION OF THE PREFERRED EMBODIMENTS

Figure 1:
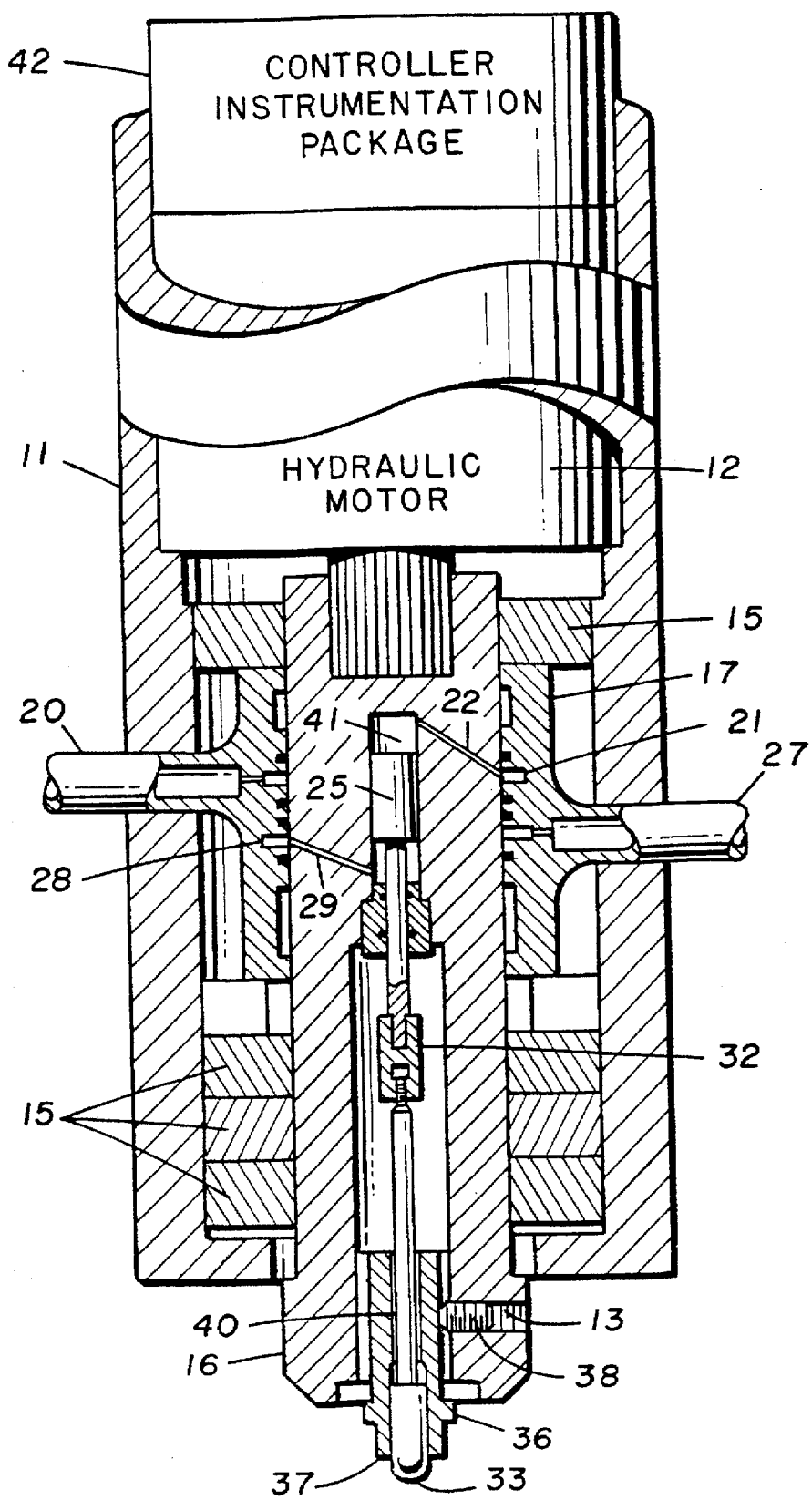
FIG. 1 is a cross section of an auto-adjustable pin tool for friction stir welding of the present invention.

In the following description, like reference characters designate like and corresponding parts throughout the several views of the drawings.

FIG. 1 illustrates a cross section of the present invention in its assembled condition. The welding head includes a spindle housing 11 which encloses a hydraulic motor 12 connected to a controller instrument package 42. The spindle housing 11 can be traversed and moved axially, but not rotated. The controller instrument package 42 controls the hydraulic motor 12, movement of the welding head, and load and pressure instrumentation, which is already known in the art, and which is integrated with an arbor 16. Bearings 15 inside the spindle housing 11 support the arbor 16 for rotation, the arbor being driven by the hydraulic motor 12. The arbor 16 has a lower opening, and encloses an interior cylinder 41 having a top end and a bottom end. Inside the spindle housing 11 and encircling the arbor 16 is a hydraulic stationary slip ring 17 having a first 21 and a second annular passageway 28. A first hydraulic line 20 connects to the first annular passageway 21 in the slip ring 17. The first annular passageway 21 is connected by a first bore 22 leading to the top end of the cylinder 41. Inside of the cylinder 41 is positioned a piston 25. A second hydraulic line 27 connects to the second annular passageway 28 in the slip ring 17. The second annular passageway 28 is connected by a second bore 29 leading to the bottom end of the cylinder 41. The piston 25 is moved to the top end or the bottom end of the cylinder 41 by controlling the hydraulic pressure in hydraulic lines 20 and 27.

The piston 25 is connected by a coupling 32 to a pin 33 having a top end and a lower end. The pin 33 is threaded on its lower end. The pin 33 is seated in a pin sleeve 36 having a shoulder 37 and a concave lower face. The pin 33 is splined to the pin sleeve 36 for relative axial movement. The pin sleeve 36 is seated in the lower opening of the arbor 16. A set screw 38 fitted into a threaded hole 13 in the arbor 16 is used to fix the relative position of the arbor 16 and the pin sleeve 36 once the position of the pin 33 is calibrated. When welding, the pin penetrates the workpieces and a vertical locating transducer in the controller instrumentation package senses contact of the shoulder 37 with the workpieces. The vertical locating transducer then causes the shoulder 37 to be positioned a predetermined distance below the workpieces' surface. This distance will vary depending on the material's hardness. At the same time, the differential pressure across the piston 25 is being monitored. If a pressure delta above a programmed value is detected, the appropriate hydraulic line opens and allows the piston 25 to adjust the pin 33 to the proper depth.

Weld joint termination and close-out takes advantage of this active control process. At the end of a predetermined weld length, the programmed software controls pin 33 retraction from the weld joint while still maintaining shoulder 37 contact for workpiece material forging and consolidation. As a result any workpiece voids, holes, craters or keyholes associated with pin removal under the prior art are eliminated.

Figure 2:
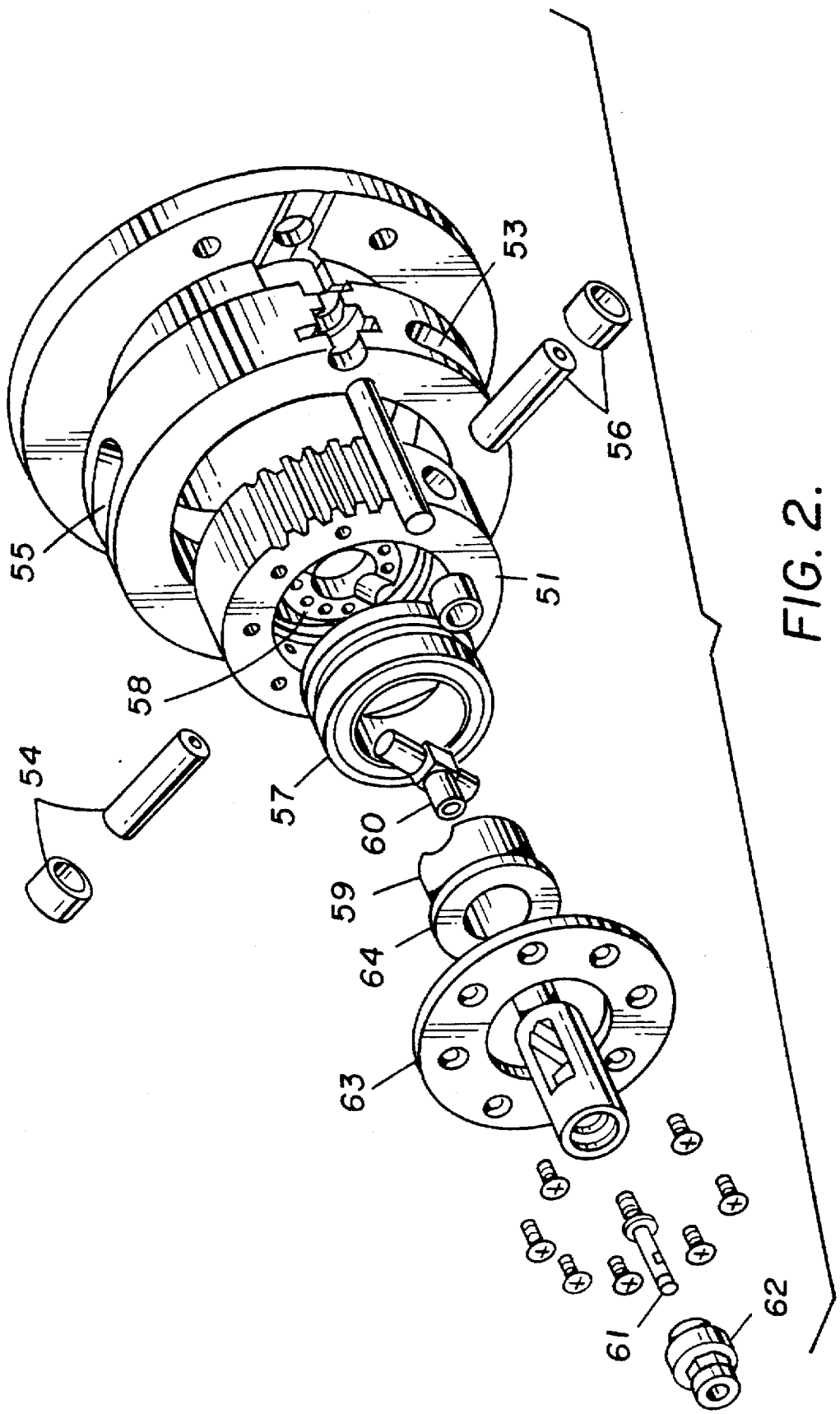
FIG. 2 is an exploded perspective view of an auto-adjustable pin tool for friction stir welding showing an alternate embodiment wherein the present invention is actuated by electrical means.

FIG. 2 illustrates an exploded perspective view of an alternate embodiment of the present invention wherein the means powering the present invention are electrical. The welding head, spindle housing, spindle tool holder, motor, and controller instrument package are similar in configuration and operation to the hydraulic motor embodiment except the motor is electrical. Fixedly attached to a known milling machine's spindle housing is a main housing 50 forming a cylinder and enclosing an interior cavity, and having a cylindrical wall with an outer surface and an inner surface, and a gear slot extending through the cylindrical wall, said main housing having a top opening and a bottom opening, and a first cam 53 and a second cam 55 formed as openings at opposed positions in the cylindrical wall (each cam being at an oblique angle to the planes formed by the top and bottom openings, and at a reverse angle relative to the other cam) and partially traversing the cylindrical wall. The main housing 50 is fixedly attached to the milling machine's spindle housing so that the milling machine's spindle tool holder extends through the main housing's top opening. A pin tool holder 52 having a top end and a bottom end is demountably fixed by its top end to the spindle tool holder and extends through the main housing's 50 top opening. Demountably fixed to the bottom end of the pin tool holder 52 is a shoulder housing 62 having a top and a concave lower face, and an axial channel; it is demountably fixed at its top end to the pin tool holder. The spindle tool holder is powered to rotate in the normal manner by the milling machine. A bearing housing 51, forming a cylinder enclosing an interior cavity with a top end with an opening and a bottom end with an opening, and sized to fit the main housing 50, and having a cylindrical wall with an outer surface and an inner surface, and a plurality of threaded holes spaced evenly around the bottom end, and a first cam follower 54 and a second cam follower 56 (both extending perpendicularly from the outer surface of the bearing housing cylindrical wall, and sized and located to fit the first cam 53 and second cam 55, respectively) sits moveably within the main housing 50, with the first cam follower 54 slidably engaged by the main housing's first cam 53, and the second cam follower 56 slidably engaged by the main housing's second cam 55. When the cam followers 54, 56 move along cams 53, 55, the bearing housing 51 moves axially relative to the main housing 50. Movement of the bearing housing 51 is powered by the electrical motor which engages, through gearing, gear teeth cut into the outer surface of the cylindrical wall of the bearing housing, which are accessed through the gear slot in the cylindrical wall of the main housing 50. Demountably captured within the bearing housing is a dual tapered roller bearing 57, having a top and a bottom, and an outer race and an inner race. The roller bearing 57 is seated within the interior cavity of the bearing housing 51, and captured at its top against a flange partially extending from the inner surface of the bearing housing's cylindrical wall, and into the cavity at the top opening of the bearing housing 51. The bottom of the roller bearing is captured by a bearing housing retainer 63, sized to fit the bottom end of the bearing housing 51, and enclosing a center hole, and having a plurality of holes evenly spaced around the circumference, and which is fixedly attached to the bearing housing by screws sized to fit through the holes of the bearing housing retainer 63 and thread into opposing holes in the bearing housing 51. A cylindrical slide cap 58 having a top and a bottom, and forming a ring and having a plurality of holes evenly spaced around its circumference, and sized to extend beyond the circumference of the inner race of the roller bearing 57, is positioned over and captures the top of the roller bearing. A cylindrical slide 59, having an interior chamber, and a top with an opening and a bottom with an opening, is rotatably seated in the inner race of the roller bearing 57. The top of the cylindrical slide has a plurality of threaded holes sized and positioned to receive a plurality of screws seated in the holes of the cylindrical slide cap, and extending through the holes of the cylindrical slide cap, and into the holes of the cylindrical slide. A flange 64 extending outward from the bottom of the cylindrical slide 59 captures the bottom of the roller bearing 57. The pin tool holder 52, forming an interior chamber with two opposed slotted openings, and a lower channel extending from the interior chamber through the bottom end of the holder, extends axially from the spindle through the cylindrical slide cap 58 and the cylindrical slide 59. Situated within the interior chamber of the pin tool holder 52, and slidably captured within the slotted openings is a tee 60, having at least one upper horizontal member, and a lower vertical member (the length of the upper member being less than the diameter of the inner race of the roller bearing 57). The cylindrical slide cap 58 and the cylindrical slide 59, have two opposing half-circle notches positioned such that circular openings are formed in the cylinder created when the bottom of the slide cap and the top of the slide are demountably fixed together. Fixedly captured within these notches are the upper horizontal members of the tee 60. A pin 61 having a flange, a threaded lower end, a top end, and sized to fit the lower channel of the pin tool holder 52, is demountably fixed at its upper end to the bottom of the lower vertical member of the tee 60 and slidably extends through, and out of, the lower channel of the pin tool holder 52. A shoulder housing 62 having a top and a concave lower face, and an axial channel, is demountably fixed at its top to the bottom end of the pin tool holder 52. The pin 61 slidably extends through the shoulder housing's 62 axial channel, with the pin flange (which is sized larger than the shoulder housing's axial channel, and smaller than the pin tool holder's 52 lower channel) positioned between the bottom of the lower vertical member of the tee 60, and the top of the shoulder housing. The pin 61 protrudes beyond the concave lower face of the shoulder housing 62 exposing its treaded lower end which engages the workpiece.

We claim:

1. An auto-adjustable pin tool for friction stir welding, comprising;

a pin, having a top and a lower end, the lower end being threaded, and;

a pin sleeve having a lower face, and an interior axial channel sized to receive the pin, so that when seated in the pin sleeve the lower end of the pin extends beyond the lower face of the pin sleeve;

means for axial movement of the pin sleeve;

means for axial movement of the pin;

a controller instrument package containing means for sensing the pressure on the pin sleeve lower face, and on the pin, and means for controlling the axial movement of the pin and the pin sleeve.

2. An auto-adjustable pin tool for friction stir welding as recited in claim 1, in which the means for axial movement of the pin comprises:

an arbor enclosing an interior cylinder having a top end and a bottom end;

a piston positioned inside the interior cylinder;

a coupling connecting the piston to the pin;

a means for axially moving the piston between the top end and the bottom end of the interior cylinder.

3. An auto-adjustable pin tool for friction stir welding as recited in claim 2, in which the means for axial movement of the piston comprises:

a hydraulic stationary slip ring encircling the arbor, and having a first and a second annular passageway;

a first hydraulic line connecting to the first annular passageway in the slip ring;

a second hydraulic line connecting to the second annular passageway in the slip ring;

a first bore connecting the first annular passageway to the top end of the interior cylinder;

a second bore connecting the second annular passageway to the bottom end of the interior cylinder.

4. An auto-adjustable pin tool for friction stir welding as recited in claim 2, wherein the pin sleeve is fixed to the arbor by a set screw threaded through the arbor.

5. An auto-adjustable pin tool for friction stir welding as recited in claim 1, wherein the lower face of the pin sleeve is concave.

6. An auto-adjustable pin tool for friction stir welding, comprising;

a pin, having a top and a lower end, the lower end being threaded, and;

a shoulder housing having a lower face, and an interior axial channel sized to receive the pin, so that when seated in the shoulder housing the lower end of the pin extends beyond the lower face of the shoulder housing, means for axial movement of the shoulder housing;

means for axial movement of the pin;

a controller instrument package containing means for sensing the pressure on the shoulder housing lower face, and on the pin, and means for controlling the axial movement of the pin and the shoulder housing.

7. An auto-adjustable pin tool for friction stir welding as recited in claim 6, wherein the means for axial movement of the shoulder housing is an electrical motor.

8. An auto-adjustable pin tool for friction stir welding as recited in claim 6, in which the means for axial movement of the pin comprises:

a main housing forming a cylinder and enclosing an interior cavity, and having a cylindrical wall through which are formed a plurality of cams;

a bearing housing forming a cylinder and enclosing an interior cavity with a top end and a bottom end, and a flange partially extending into the interior cavity at the top end, and having a cylindrical wall with an outer and an inner surface, and a plurality of cam followers extending from the outer surface, said bearing housing being moveably seated in the main housing such that the cam followers are slidably engaged in the cams;

a roller bearing, having a top and a bottom, and an inner and an outer race, and seated within the interior cavity of the bearing housing, and captured at the top by the bearing housing flange;

a bearing housing retainer, demountably fixed to the bottom of the bearing housing and capturing the bottom of the bearing;

a pin tool holder having a top end and a bottom end, and forming an interior chamber with a plurality of slotted openings, and a lower channel extending from the interior chamber through the bottom end of the pin tool holder;

a tee having at least one upper horizontal member and a lower vertical member, and a top and a bottom, and seated within the interior chamber of the pin tool holder such that the horizontal members are slidably captured within the plurality of slotted openings in the pin tool holder, and the top end of the pin is demountably fixed to the bottom of the lower vertical member, and extends through, and out of, the lower channel of the pin tool holder;

a cylindrical slide cap forming a ring and having a top and a bottom, and sized to extend beyond the circumference of the inner race of the roller bearing, and having a plurality of half-circle notches formed in the bottom, said cylindrical slide cap seated on and capturing the top of the roller bearing;

a cylindrical slide forming an interior chamber, and having a top with an opening and a bottom with an opening, and a flange extending outward from the bottom, said cylindrical slide rotatably seated within the roller bearing, with the flange capturing the bottom of the roller bearing, and a plurality of half-circle notches formed in the top of said cylindrical slide, said cylindrical slide demountably fixed to the slide cap so that the cylindrical slide's and the cylindrical slide cap's respective half-circle notches form circles, in which are captured the plurality of upper horizontal members of the tee;

means for rotating the bearing housing relative to the main housing.

9. An auto-adjustable pin tool for friction stir welding as recited in claim 8, wherein the means for rotating the bearing housing relative to the main housing comprises;

a gear slot formed through the cylindrical wall of the main housing;

gear teeth cut into the outer surface of the cylindrical wall of the bearing housing, and positioned so that they are accessible through the main housing's gear slot;

an electrical motor with gearing sized to fit the gear slot in the main housing and engage the gear teeth in the bearing housing.

10. An auto-adjustable pin tool for friction stir welding as recited in claim 8, wherein the roller bearing is a dual tapered roller bearing.

11. An auto-adjustable pin tool for friction stir welding as recited in claim 8, in which the means for demountably fixing the bearing housing retainer to the bottom of the bearing housing comprises:

- a bearing housing a plurality of threaded holes spaced evenly around the bottom opening;
- a bearing housing retainer, sized to fit the bottom of the bearing housing, and enclosing a center hole, and having a plurality of holes sized and spaced to correspond to the holes in the bottom of the bearing housing;
- a plurality of screws sized to fit through the plurality of holes in the bearing housing retainer, and threaded into the holes in the bottom of the bearing housing.

12. An auto-adjustable pin tool for friction stir welding as recited in claim 8, in which the means demountably fixing the cylindrical slide cap to the cylindrical slide comprises:

- a cylindrical slide cap having a plurality of holes spaced evenly around its circumference;
- a cylindrical slide having a plurality of threaded holes in its top, and;
- a plurality of screws seated in and extending through the holes of the cylindrical slide cap and into the threaded holes of the cylindrical slide.

13. An auto-adjustable pin tool for friction stir welding as recited in claim 6, wherein the lower face of the shoulder housing is concave.

* * * * *